Feb. 6, 1934.  E. F. ROSSMAN ET AL  1,945,568

SHOCK ABSORBER

Original Filed Oct. 7, 1931

Inventors
Edwin F. Rossman
Frederick D. Gunston
By Spencer, Hardman & Fehr
Attorneys Patented Feb. 6, 1934

1,945,568

UNITED STATES PATENT OFFICE 1,945,568

SHOCK ABSORBER

Edwin F. Rossman and Frederick D. Funston, Dayton, Ohio, assignors to Delco Products Corporation, Dayton, Ohio, a corporation of Delaware Application October 7, 1931, Serial No. 567,394
Renewed May 31, 1932

22 Claims. (Cl. 188—88)

This invention relates to improvements in hydraulic shock absorbers.

It is among the objects of the present invention to provide a shock absorber of the hydraulic type with a fluid flow control device adapted to be adjusted automatically in accordance with variations in the temperature of the fluid.

Another object of the present invention is to provide a device which will render the temperature controlled fluid flow control device effective only after a predetermined pressure is attained within the shock absorber.

Further objects and advantages of the present invention will be apparent from the following description, reference being had to the accompanying drawing wherein a preferred embodiment of one form of the present invention is clearly shown.

Figure 1:
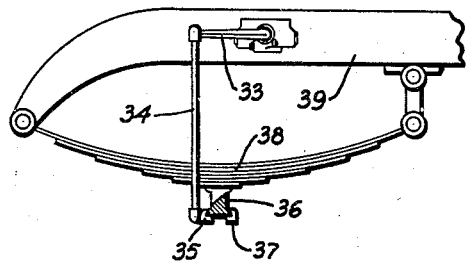
Fig. 1 is a fragmentary side view of the vehicle chassis, a shock absorber equipped with the present invention being shown attached thereto.
Figure 3:
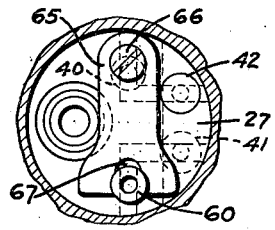
Fig. 3 is a detail end view of the fluid displacement member or piston taken in the direction of the arrow 3 of Fig. 2.

Referring to the drawing, the shock absorber comprises a casing 20 providing a fluid reservoir 21 and a cylinder 22. The ends of the cylinder are closed by the cylinder head caps 23 and 24 respectively. Within the cylinder there is provided a piston 25 having head portions 26 and 27. The head portion 26 forms the vehicle spring compression control chamber 28, while the piston head portion 27 forms the vehicle spring rebound control chamber 29.

A central recess in the piston 25 receives the end 30 of the rocker arm 31 which is supported upon a shaft 32 journalled transversely of the casing. One end of this shaft extends outside the casing and has the shock absorber operating arm 33 attached thereto. The free end of this arm is swivelly connected with one end of a link 34, the opposite end of said link being swivelly attached to a bracket 35 which is secured to the vehicle axle 36 by a clamping member 37. The axle 36 carries vehicle springs 38, which in turn support the vehicle frame 39 upon which the body of the vehicle is mounted.

The spring compression control chamber 28 and the spring rebound control chamber 29 are in constant communication with each other through various ducts or passages in parts of the shock absorbers, these passages being designated by the numerals 44, 45, 80 and 82 respectively. The present drawing illustrates the passages 44 and 45 as being provided in the piston 25, and ducts or passages 80 and 82 as being provided in the casing of the shock absorber.

Figure 2:
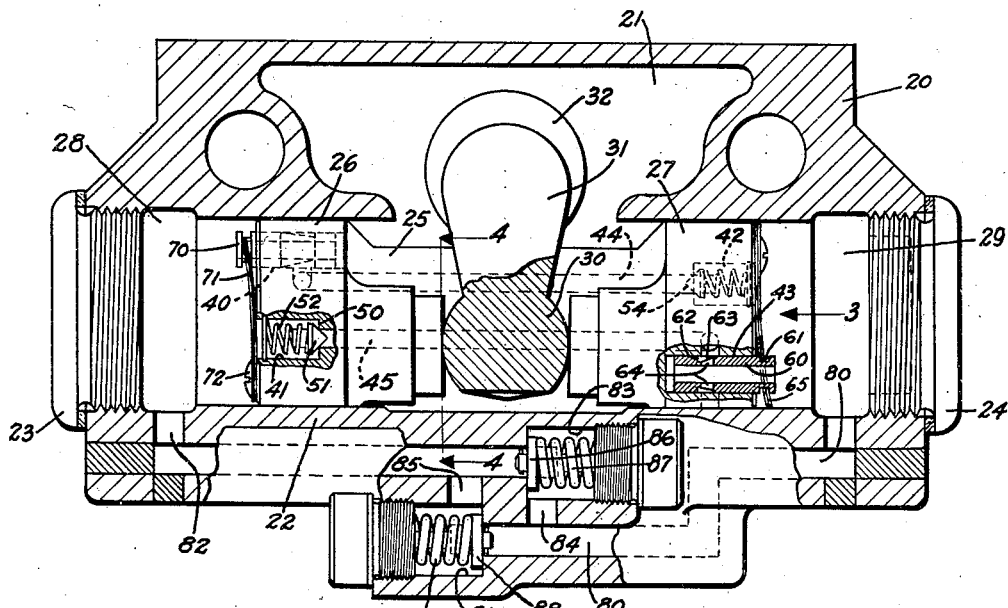
Fig. 2 is a sectional view of the shock absorber taken longitudinally thereof, certain parts being shown in elevation for the sake of clearness.
Figure 4:
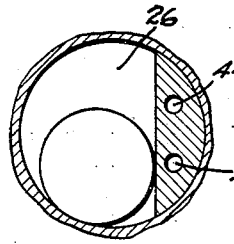
Fig. 4 is a transverse sectional view of the piston taken substantially midway between its ends along the line 4—4 of Fig. 2.

In each end of the piston there is provided two recesses, the one in the piston head portion 26 being designated by the numeral 40, the other in the same piston head portion by the numeral 41. The recess in the piston head portion 27 which corresponds to the recess 41 of the piston head 26, is designated by the numeral 42, while the recess of piston head 27 which corresponds to the recess 40 of the piston head 26 is designated by the numeral 43. A duct 44 connects recess 40 with the recess 42. As shown in Fig. 2, duct 44 opens into the side wall of recess 40 intermediate the bottom and open end thereof, while said duct opens into the bottom wall of the recess 42 at the opposite end of the cylinder. Another duct 45 similar to duct 44 opens into the side wall of the recess 43 at one end of the piston and in the bottom wall of the recess 41 at the opposite end of the piston. From this it may be seen that ducts 44 and 45 provide for the transfer of fluid from one side of the piston to the other, or more specifically for the transfer of fluid between the compression chambers 28 and 29 respectively.

Recesses 41 and 42 of the respective piston head portions 26 and 27 are both provided with pressure operating valves, and inasmuch as both are alike, only one of them will be described detailedly.

The duct opening into the recess 41 being of smaller transverse dimensions than said recesses, provides an annular valve seat 50 which is adapted to be engaged by a valve 51 having a tapered head. This valve is yieldably urged into engagement with the valve seat 50 by a spring 52 so that normally communication between the duct 45 and the recess 41 is closed. The tension of spring 52 is such that the valve 51 will not be moved from its seat to establish communication between the duct 45 and the recess 41 until a predetermined pressure upon the fluid within the chamber 29 is attained. Valve 54 in the recess 42, which valve is comparable to valve 51, will not be moved from its seat to establish communication between duct 44 and recess 42 until a predetermined fluid pressure is attained within the chamber 28.

Recesses 40 and 43 are both provided with a fluid flow metering device and, due to the fact that both these devices are similar, only one of them will be described detailedly for the sake of brevity.

Referring to the fluid flow metering device in the piston head portion 27, the numeral 60 designates the tubular member which is slidably carried in the recess 43, the one end of said member extending beyond the outer surface of the piston head portion 27 as shown in Fig. 2. This end of the tubular member has an outer annular groove 61 for the purposes to be described. An annular groove 62 is provided in the outer surface of the tubular member 60, the bottom wall of said groove designated by the numeral 63 sloping relative to the axis of the tubular member 60. Cross passages 64 connect the groove 62 with the interior of the tubular member 60. At all times groove 62 will be in communication with the end of the duct 45 opening into the side wall of the recess 43. However, due to the fact that the bottom wall 63 of the annular groove 62 is sloping, the orifice presented between the groove 62 and the open end of duct 45 will vary in accordance with the position of the tubular member in the recess 43. When the tubular member 60 is moved toward the outer end of the recess 43, a greater fluid orifice will be presented between the duct 45 and the groove 62 than when the tubular member 60 is moved inwardly toward the bottom of the recess 43, thus to restrict the flow of fluid from the tubular member into the duct 45 it will be necessary to move the tubular member 60 toward the bottom wall of recess 43.

From the aforegoing description of the valve 60 and which is also true of the valve 70, it may be seen that pressure will not effect an adjustment of this valve for, pressure acting upon the outer end of the valve tending to move it inwardly acts also in a like manner on the inner end of the valve tending to move it outwardly. The annular groove 62 communicating with the duct 45 through side openings 64 tends to prevent any pressure through these passages in effecting the adjustment of the valve and consequently valves 60 and 70 may be said to be substantially unaffected by fluid pressure.

The present invention provides for an automatic adjustment of the tubular member 60 to obtain the proper orifice in accordance with temperature conditions of the fluid within the casing. The adjusting device comprises a bi-metal strip 65 secured at one end to the outer face of the piston 27 by a screw 66 or any other suitable anchoring means, the opposite or free end of said bi-metal strip being slotted as at 67, this slotted end fitting into the annular groove 61 of the tubular member 60 so that the bi-metal strip 65 is operatively connected with the slidable tubular member 60. When the viscosity of the fluid within the shock absorber increases because of lowering temperatures, said lowering temperatures will cause the bi-metal strip 65 to flex in such a direction that it will move the tubular member 60 outwardly in the recess 43 so as to decrease the offset between the groove 62 and the end of the duct 45 communicating with the recess 43. The opposite is true when at increasing temperatures the viscosity of the fluid decreases. The tubular member in the recess 40 of the piston head portion 26 which corresponds to the tubular member 60 of the piston head portion 27 is designated by the numeral 70. The bi-metal strip for operating or adjusting the tubular member 70 in response to and in accordance with temperature variations of the fluid within the shock absorber is designated by the numeral 71, this strip being attached to the outer end surface of the piston head portion 26 by screws or any other suitable anchoring means 72.

As shown in Fig. 2, a duct or channel 80 is provided in the casing 20, said duct or channel leading from the spring rebound control chamber 29 into a valve chamber 81. A similar duct 82 in the casing leads from the spring compression control chamber 28 into a valve chamber 83. A cross passage 84 connects the valve chamber 83 with the duct 80, while a similar cross passage 85 connects duct 82 with the valve chamber 81.

In the valve chamber 83 there is provided a valve 86 urged normally to close communication between the duct 82 and the valve chamber 83 by a spring 87. A similar valve 88 is urged to close communication between duct 80 and the valve chamber 81 by a spring 89.

These valves 86 and 88 may be termed the high pressure release valves of the shock absorber and will not become effective until pressures are attained in the chambers 28 and 29 respectively in excess of the pressures necessary to move the valves 51 and 54 in the piston to open their respective passages.

Striking of an obstruction in the roadbed by the vehicle wheels, not shown in the drawing but supported in the vehicle axle 36, causes the springs 38 to be moved through their compression stroke toward the frame 39. This, due to the link 34 and operating arm 33, results in a clockwise movement of the rocker arm 31 and thus piston 25 is moved toward the left as regards Fig. 2, exerting a pressure upon the fluid within the spring compression control chamber 28. Fluid pressures will assist spring 52 in maintaining valve 51 upon its seat to prevent fluid within the chamber 28 from entering duct 45. In response to the pressure on the fluid it will flow through the tubular member 70 and its cross passages and annular orifice into the duct 44. When this fluid pressure has attained a proper value, valve 54 is moved from its seat and thus a restricted flow of fluid is established from the duct 44 into the spring rebound control chamber 29 whereby the movement of the piston toward the left as regards Fig. 2 is resisted and consequently the compression movement of springs 38 is likewise resisted. If the fluid pressure within the spring compression control chamber 28 becomes excessive and cannot properly be relieved by the orifice presented by the tubular member 70, then the fluid pressure acting through duct 82 will move valve 86 from its seat to establish a flow from duct 82 into the valve chamber 83 through cross passage 84 and duct 80 into the spring rebound control chamber 29.

A similar fluid flow control obtains when the piston is moved toward the right as regards Fig. 2 in response to the rebounding movement of the vehicle springs 38. In this instance a predetermined fluid pressure from chamber 29, acting through the tubular member 60 and duct 45, will move valve 51 from its seat to permit the discharge of fluid into the chamber 28. Excessive fluid pressures will be relieved by a flow from duct 80 when valve 88 is moved from its seat thence from the fluid chamber 81, cross passage 85 and duct 82 into the compression chamber 28.

As has been mentioned heretofore, temperature changes will affect fluid viscosity, and to compensate for such changes in the viscosity of the fluid, tubular members 60 and 70 are automatically adjusted by temperature responsive means in the form of bi-metallic strips 65 and 71 respectively.

In the present invention applicants have provided a temperature controlled fluid metering member in the duct of the piston, the fluid flow established through this member however being dependent upon the opening of a static, pressure operated valve.

While the form of embodiment of the present invention as herein disclosed, constitutes a preferred form, it is to be understood that other forms might be adopted, all coming within the scope of the claims which follow.

What is claimed is as follows.

1. A shock absorber comprising, in combination, a casing providing a cylinder; a piston in said cylinder forming a compression chamber therein; a duct leading from said compression chamber; and separate fluid flow control devices in said duct, one entirely closing the duct and adapted to be actuated by fluid pressure, the other in response to variations in temperature.

2. A shock absorber comprising, in combination, a casing providing a cylinder, a piston in said cylinder forming two compression chambers therein; a duct connecting said two chambers; a piston operating member; and a separate fluid flow control device in each end of the said duct, one entirely closing the duct and adapted to be actuated by pressure, the other in response to variations in temperature.

3. A shock absorber comprising, in combination, a casing providing a cylinder, a piston in said cylinder forming two compression chambers therein, said piston having a duct connecting said two chambers; a piston operating member; and fluid flow control devices in said piston duct one being operated by pressure the other in response to variations in temperature.

4. A shock absorber comprising in combination, a casing providing a cylinder; a piston in said cylinder forming a compression chamber therein; a duct leading from said compression chamber; and a fluid flow control device at each end of the duct, the fluid flow control device at the end of the duct more adjacent the compression chamber controlling the fluid flow in accordance with temperature changes, the fluid flow control device at the other end of the duct, more remote from the compression chamber, controlling the fluid flow in response to fluid pressure.

5. A shock absorber comprising, in combination, a casing providing a cylinder; a piston in said cylinder forming two compression chambers therein; a duct connecting said two chambers; a piston operating member; and a separate fluid flow control device in each end of said duct, one normally closing said duct and adapted to be actuated by pressure to establish a fluid flow through said duct, the other being adapted to be adjusted in response to and in accordance with temperature variations to vary the fluid flow through said duct.

6. A shock absorber comprising, in combination, a casing providing a cylinder; a piston in said cylinder forming two compression chambers therein, said piston having a duct connecting said two chambers; a piston operating member, and fluid flow control devices in said piston duct, one adapted to be operated by pressure to establish a fluid flow through said duct, the other being adapted to be adjusted in response to and in accordance with temperature variations to vary the fluid flow through said duct.

7. A shock absorber comprising in combination, a casing providing a cylinder; a piston in said cylinder forming the compression chamber therein; ducts connecting said compression chambers; a fluid flow control device in each end of each duct, the device at one end of a duct being adapted to control the fluid flow in accordance with temperature changes, the device at the opposite end of the same duct being adapted to establish a fluid flow in response to fluid pressure, adjacent fluid flow control devices being, one a temperature controlled and the other a pressure controlled device respectively.

8. A hydraulic shock absorber comprising, in combination, a casing providing a cylinder; a piston in said cylinder forming a compression chamber therein; a duct for the transfer of fluid from one side of the piston to the other; a fluid flow control device in each end of the duct; and a thermostatic element for adjusting one of said devices in response to and in accordance with temperature changes.

9. A hydraulic shock absorber comprising, in combination, a casing providing a cylinder; a piston in said cylinder forming a compression chamber therein; a duct in the piston for the transfer of fluid from one side of the piston to the other; a fluid flow control device in each end of the duct, and a thermostatic element on the piston for adjusting one of said devices in response to and in accordance with temperature changes.

10. A hydraulic shock absorber comprising, in combination, a casing providing a cylinder; a piston in said cylinder forming a compression chamber therein; a duct providing for the transfer of fluid from one side of the piston to the other; a pressure operated valve in one end of said duct; a pressure unaffected fluid flow control device in the other end of the duct; and a thermostatic element for adjusting the pressure unaffected device in response to and in accordance with temperature variations.

11. A hydraulic shock absorber comprising, in combination, a casing providing a cylinder; a piston in said cylinder forming a compression chamber therein; a duct in the piston for the transfer of fluid from one side of the piston to the other; a pressure operated valve in one end of said piston duct; a pressure unaffected fluid flow control device in the other end of the piston duct; and a thermostatic element on the piston for adjusting the pressure unaffected device in response to and in accordance with temperature variations.

12. A hydraulic shock absorber comprising, in combination, a casing providing a cylinder; a piston in said cylinder forming a compression chamber therein; a duct in the piston for the transfer of fluid from one side of the piston to the other; a spring-loaded pressure release valve in the one end of the piston duct; a fluid flow metering device in the opposite end of the duct; and a bi-metal member carried by the piston and engaging said metering device for adjusting it to vary its metering effect in response to and in accordance with temperature variations.

13. A hydraulic shock absorber comprising, in combination, a casing providing a cylinder; a piston in said cylinder forming a compression chamber therein; a duct providing for the transfer of fluid from one side of the piston to the other; a fluid flow metering device slidably carried in the end of the duct communicating with the compression chamber, said device being substantially unaffected by fluid pressure; a bi-metal member for adjusting the metering device in response to and in accordance with temperature variations; and a valve in the other end of the duct for establishing a flow of fluid in one direction through its duct and in response to a predetermined pressure within the compression chamber.

14. A hydraulic shock absorber comprising, in combination, a casing providing a cylinder; a piston in said cylinder forming a compression chamber therein; a duct in the piston for the transfer of fluid from one side of the piston to the other; a fluid flow metering device slidably carried in the end of the duct communicating with the compression chamber, said device being substantially unaffected by fluid pressure; a bi-metal member carried by the piston for adjusting the metering device in response to and in accordance with temperature variations; and a valve in the other end of the duct for establishing a flow of fluid in one direction through its duct and in response to a predetermined pressure within the compression chamber.

15. A hydraulic shock absorber comprising, in combination, a casing providing a cylinder; a piston in said cylinder forming two compression chambers therein; ducts in the piston connecting said chambers; ducts in the casing connecting the said chambers; a fluid flow controlling device in each piston duct; temperature responsive means connected to each of said devices for adjusting them to vary the flow of fluid through the respective piston ducts in accordance with temperature variations; a pressure operated fluid flow control valve in each piston duct; and pressure operated valves in the ducts of the casing.

16. A hydraulic shock absorber comprising, in combination, a casing providing a cylinder; a piston in said cylinder forming two compression chambers therein; ducts in the piston connecting said chambers; ducts in the casing connecting the said chambers; a fluid flow metering device in one end of each piston duct; a bi-metal member carried at each end of the piston, engaging a respective metering device and adapted to adjust the device to vary its metering effect upon the flow of fluid into its respective duct in response to and in accordance with the temperature of the fluid; a spring loaded valve in the end of each piston duct opposite the metering device for establishing a flow of fluid through its duct in response to a predetermined fluid pressure; and a pressure release valve in each duct of the casing adapted to establish fluid flows between the compression chambers in response to a predetermined high fluid pressure therein.

17. A hydraulic shock absorber comprising, in combination, a casing providing a cylinder; a piston in said cylinder forming two compression chambers therein; ducts in the piston connecting said chambers, each duct having a valve chamber at each end thereof, opening into the respective compression chamber; a tubular member slidably supported in one valve chamber of the respective piston ducts and being adapted variably to restrict the flow of fluid into the duct in accordance with its position in the valve chamber; a pressure release valve in the other valve chamber of the respective piston; ducts adapted to establish a flow of fluid through its respective duct in response to a predetermined low pressure in the compression chamber; a bi-metal strip secured to each end of the piston and engaging a respective tubular member; each strip being adapted to adjust its tubular member relative to the piston duct to vary the restriction to the flow of fluid therein in response to and in accordance with the temperature of the fluid in the compression chamber; and a pressure release valve in each duct of the casing adapted to establish a flow of fluid from one compression chamber into the other in response to a predetermined higher fluid pressure than is necessary to operate the pressure release valves in the piston.

18. A hydraulic shock absorber comprising, in combination, a casing providing a cylinder; a piston in said cylinder forming two compression chambers therein; said piston having two recesses in each end thereof, two ducts in the piston, each leading from the side wall of one piston recess into the bottom wall of a recess at the opposite end of the piston; a tubular member slidably carried in each piston recess having a piston duct opening into its side wall, each tubular member having an outer annular groove the bottom surface of which slopes relative to the axis of the member said groove being in communication with the interior of the tubular member through side passages; a strip of bi-metal anchored at each end of the piston and engaging with an annular groove in its respective tubular member for moving said member longitudinally of the piston recess to vary the restriction to the flow of fluid into its respective duct in response to and in accordance with temperature variations of the fluid and independently of fluid pressure; a pressure release valve in each piston recess having a piston duct opening into its bottom wall, for establishing a fluid flow in the respective duct in response to a predetermined fluid pressure; ducts in the casing connecting the compression chambers; and pressure release valves in said ducts for establishing a fluid flow therethrough in response to a fluid pressure comparatively higher than is necessary to open the pressure release valves in the piston.

19. A shock absorber comprising, in combination, a casing providing a cylinder; a piston in said cylinder forming a compression chamber therein; a duct leading from said compression chamber; and a separate fluid flow control device for each end of said duct, one normally closing the duct and being adapted to be actuated by fluid pressure to establish a flow of fluid through the duct, the other being adapted to be adjusted in response to temperature variations to meter the fluid flow through said duct, independently of the said one device.

20. A shock absorber comprising, in combination, a casing providing a cylinder; a piston in said cylinder forming a compression chamber therein; a duct leading from said compression chamber; a pressure release valve normally closing said duct; a fluid metering valve adapted to regulate the flow of fluid through said duct; and a thermostatic member engaging the metering valve and adapted to move it to vary its regulating effect upon the fluid flow in response to variations in temperature of the fluid.

21. A shock absorber comprising, in combination, a casing providing a cylinder; a piston in said cylinder forming a compression chamber therein; a duct leading from said compression chamber; a pressure release valve normally closing said duct and adapted in response to a predetermined fluid pressure within said duct to establish a flow of fluid through the duct; a fluid metering valve adapted to restrict the flow of fluid into said duct; and a thermostatic member engaging said metering valve to adjust it for varying its restriction to the flow of fluid into the duct in response to variations in temperature.

22. A shock absorber having a fluid chamber provided with an outlet passage; a fluid displacement member in said chamber; a fluid flow control device normally closing one end of said outlet passage and adapted in response to a predetermined fluid pressure to establish a flow of fluid from said passage; and another fluid flow control device in said passage, spaced from and independent of the first mentioned device, and adapted, in response to and in accordance with temperature changes to restrict the fluid flow through said passage.

EDWIN F. ROSSMAN.
FREDERICK D. FUNSTON.